Feb. 20, 1940.  E. M. BRANSON  2,190,646
OPTICAL DEVICE
Filed May 21, 1937  2 Sheets-Sheet 1
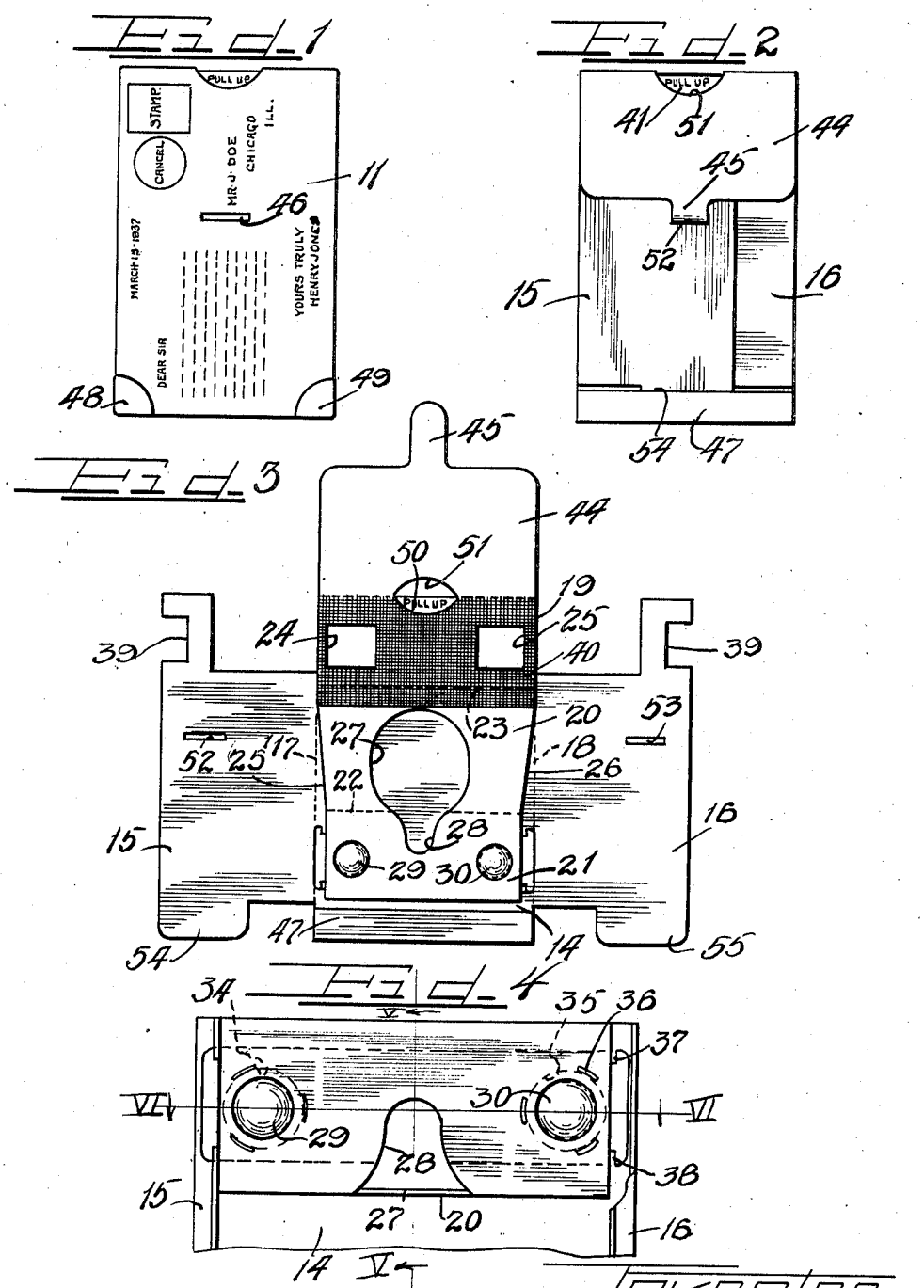

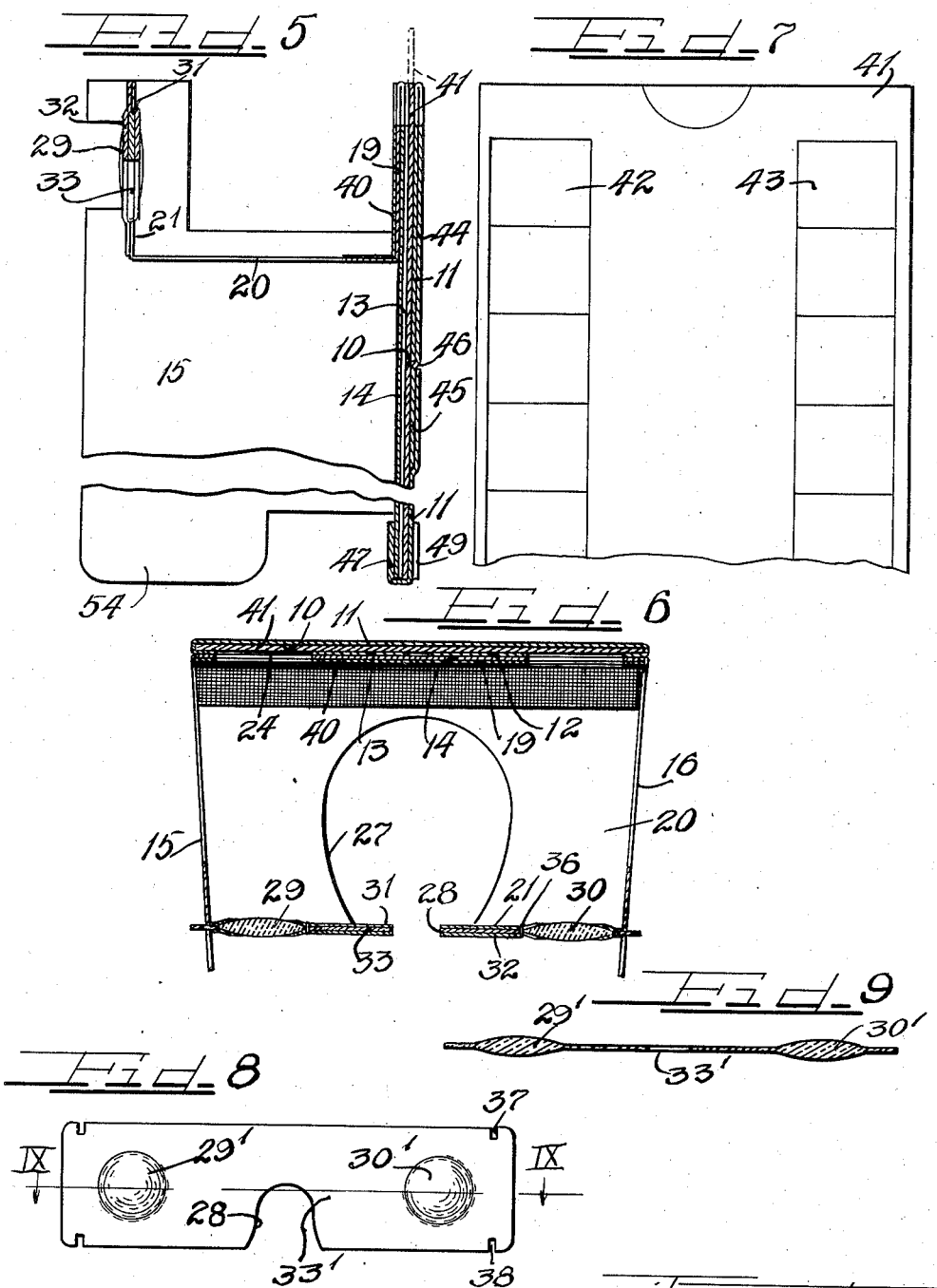

Patented Feb. 20, 1940

2,190,646

UNITED STATES PATENT OFFICE 2,190,646

OPTICAL DEVICE

Ellis M. Branson, Orlando, Fla.

Application May 21, 1937, Serial No. 143,923

4 Claims. (Cl. 88—29)

The present invention relates in general to an optical device, and is more particularly concerned with an improved stereoscope of such construction that it may be folded, when not in use, so as to effect a relatively thin package or envelope suitable for mailing, if desired; and which may be readily unfolded to bring the lenses and associated parts into operative relationship, when it is desired to utilize the same.

It is also an object of the present invention to provide novel advertising means for disseminating information.

A further object is to provide novel means for entertainment, instruction, and education.

A further object is to provide novel mailable message bearing means and mailable souvenirs.

A further object of the invention is to provide a simplified and economical means for reproducing, transmitting, and preserving natural vision.

Another object is to provide an improved mailing piece or advertising medium, wherein indicia such as pictures and the like associated therewith may be viewed in relief.

A still further object is to provide an optical device of the character described which may be manufactured at a low cost, which may be knocked down so as to take up a relatively small space, when not in use; and in which the various parts may be readily moved to assembled operative relationship, when it is desired to use the same.

In accordance with the general features of the present invention, it is proposed to provide a mailing piece in the form of an open-ended envelope having spaced windows at one end in one of its surfaces. A wing member is hinged at one of its ends adjacent these windows for swinging movement longitudinally of the envelope. This wing member at its free end has a hinged section containing laterally spaced lenses, whereby the hinged section may be disposed in parallel spaced relation to the envelope with the lenses respectively disposed for viewing the above-mentioned windows. The hinged section is held in operative relation to the windows by means of lateral wings hinged to the lateral margins of the envelope, these wings being swingable to positions substantially at right angles to the envelope and connectible through appropriate means such as tongue and slot connections to the hinged section containing the lenses. With the device thus set up, various complementary pictures or other indicia may be disposed in the windows and viewed in relief through the lenses.

In order to provide means whereby a series of pictures or other indicia may be displayed, a strip or card having the pictures on its surface is disposed for sliding movement in the envelope. By shifting the card longitudinally to withdraw it from the open end of the envelope, the pictures may be successively brought into view through the windows.

When the device is to be knocked down for mailing or other purpose, the lateral wings are disconnected relative to the section containing the lenses and this section together with its associated wing are moved so as to lie in the same plane along the envelope, whereupon the lateral wings may be inwardly folded to lappingly overlie the lenses and associated wing. The three wings thus disposed are held in position by an end flap of the envelope, which may be secured by appropriate means in a position closing the open end of the envelope and overlying the outermost of the folded wings.

With the parts in knocked-down relationship, a flat mailing piece is formed with ample surface for addressing, etc., provided.

Other objects and features of the invention will more fully appear from the following detailed description, taken in connection with the accompanying drawings, which illustrate several embodiments thereof, and in which:

Figure 1 is a plan view looking at one side of the device, the parts being in knocked-down relationship, and showing the manner in which this side may be utilized for mailing purposes;

Figure 2 is a plan view on the opposite side of the same, showing the manner in which the various wing portions are folded and secured together;

Figure 3 is a plan view of the same showing the device opened up prior to its being assembled into operative position;

Figure 4 is an enlarged fragmentary view showing the manner in which the wings are assembled and connected with the lenses in operative position to view the windows of the device;

Figure 5 is an enlarged fragmentary sectional view on the same, taken substantially on line V—V of Figure 4;

Figure 6 is a transverse sectional view of the same, taken substantially on line VI—VI of Figure 4;

Figure 7 is an enlarged fragmentary plan view of the indicia carrying strip or card;

Figure 8 is a plan view of a modified form of lens arrangement; and

Figure 9 is a longitudinal sectional view through the same, taken substantially on line IX—IX of Figure 8.

As shown on the drawings:

The main body portion of the device is in the form of an envelope having a pocket 10 which is formed from a single sheet of material by folding the marginal edges upon itself to form a main back portion 11 and inwardly extending portions 12 and 13 defining the forward wall of the envelope pocket.

Secured to the outer surface of the portions 12 and 13 is a single sheet of material having a main portion 14 which is co-extensive with the envelope portion and which is secured to the portions 12 and 13 in any appropriate manner as by gluing or otherwise.

The sheet from which the main portion 14 is constructed is laterally extended to form wings 15 and 16 which extend beyond the lateral edges of the envelope and are provided with fold lines 17 and 18 which are coincident with the lateral edges of the envelope.

At the open end of the envelope, as shown in Figure 5, the sheet from which the portion 14 and wings 15 and 16 are formed, is bent back upon itself to form an overlying section 19 which is glued or otherwise secured to the outer face of the portion 14.

The portion 19 is extended to form a flap or wing portion made up of hinged sections 20 and 21, the sections 20 and 21 being integrally formed and joined at a bend line 22. The section 20 is integrally formed with the portion 19 and is arranged to bend on a bend line 23.

The associated portions 14 and 19 are provided with spaced square or rectangular openings 24 and 25 which give entrance to the envelope pocket.

It will be observed that the lateral edges 25' and 26 of the section 20 are in converging relation from points substantially at the bend line 23 to the bend line 22 so as to bring the end edges of section 21 into inwardly spaced position relative to bend lines 17 and 18 respectively.

As shown in Figure 3, the sections 20 and 21 are provided with a substantially elliptical opening 27 in the section 20 which is contracted at one end to form a displaced cut-out portion 28 in the section 21. The purpose of this opening will be more readily apparent from the subsequent description.

The section 21 has fitted therein a pair of spaced lenses 29 and 30 which are arranged, when the sections 20 and 21 are properly folded, as will hereafter be explained in detail, to be cooperatively associated with the windows 24 and 25 to form an optical device commonly known as a stereoscope.

As shown in Figures 4 and 5, the section 21 is formed by bending the end margin of the material back upon itself to form outside layers 31 and 32 which are disposed on opposite sides of a lens holding strip 33 of any suitable material such as cardboard, metal, fiber, or moldable plastic material such as Celluloid.

The Celluloid strip adjacent its ends is provided with circular apertures 34 and 35 for receiving the lenses 29 and 30. The layers of material 31 and 32 are likewise provided with aligned apertures of slightly less diameters than the apertures in the lens holding strip so that the marginal portions of the layers 31 and 32 will overlap the marginal edges of the lenses so as to retain them within the openings of the strip. The assembled parts of this section are secured in assembled relation by means of metallic clips 36 which extend through the sections 31, 32, and strip 33.

The respective ends of the lens holding strip project outwardly of the ends of section 21 and are provided with aligned notches 37 and 38 at each end, these notches being arranged to be connectingly associated with the end edges of a notch 39 formed in the uppermost ends of the free edges of the wings 15 and 16, as shown in Figure 3.

As shown in Figures 3 and 5, the exposed surface of portion 19 and marginal portion of section 20 to adjacent bend line 23 are preferably covered with a black paint or other material 40 so as to surround the window openings 24 and 25 with a surface which will not have a tendency to reflect light into the lenses 29 and 30, when the device is being used. Also, this blackened area tends to render the areas surrounding the windows substantially invisible or at least unnoticeable as the indicia in the windows is being viewed. These windows produce the effect of looking through openings at a distant scene or other indicia, and the black areas greatly accentuate the picture.

When the device is assembled to bring the parts into position to form a stereoscope, the section 20 is swung to a position substantially vertical to the envelope proper, and the section 21 is swung to bring the lenses over the windows 24 and 25, the section 21 being substantially at right angles to the section 20 in this position. The wings 15 and 16 are then swung to positions substantially at right angles to the envelope proper and the notches 37 and 38 are connectingly associated with the notches 39 of the wings 15 and 16. It will thus be seen that a box-like arrangement is thus formed and that when complementary indicia such as pictures are disposed in the windows 24 and 25, these pictures will be viewed through the lenses 29 and 30 in relief.

In looking through the lenses, it will be apparent that the eyes may be easily disposed over the lenses and that there will be no interference with the nose or other portions of the face, since the nose may project through opening 27, and the opening 28 in section 21 is so formed as to conveniently fit over the arch of the nose.

In order to provide for the disposing of successive sets of pictures or other indicia in the windows 24 and 25, there is normally disposed in the pocket 10 of the envelope a strip or card 41 which will be supported in the envelope for longitudinal sliding movement and may be withdrawn. The lateral margins on this card bear aligned sets of pictures 42 and 43, or other indicia, which are spaced apart and form complementary sets such that when a picture or indicia in the row 42 is disposed in window 24 a complementary picture in row 43 will be disposed in window 25. It will, therefore, be evident that as the card 41 is withdrawn from the envelope successive pictures will be presented in the viewing windows. Since these pictures or indicia may be viewed through the lenses 29 and 30 as in the customary stereoscope, the composite picture as seen will be in relief and give the illusion of depth.

While in the present instance only one card is described as being disposed in the pocket of the envelope, it will be readily apparent that a number of cards may be placed therein.

Although the pictures or other indicia are shown in Figure 7 as being disposed on only one surface of the card 41, it is contemplated that these indicia may be disposed on both surfaces of the card if desired. These indicia may, for example, comprise photographs, drawings and etc. which may be pasted or otherwise secured to the card surfaces. However, where the indicia are to be arranged on both sides of the card, I have found it desirable to provide a unitary construction by making the card 41 of a relatively heavy paper or other suitable material which is coated on both surfaces with a light sensitive emulsion so that the pictures or other indicia may be printed directly on the card from suitable negatives. Of course, this method may also, if desired, be utilized where the indicia appears on only one surface of the card.

As shown in Figure 5, it will be observed that the uppermost end of the back member 11 is provided with an integrally formed flap 44 having at its free edge a tongue 45. When using the device as a stereoscope, this flap may be secured in superposed relation relative to the back 11, as shown in Figure 5, by inserting the tongue 45 into an appropriate slot 46 provided in the back member 11.

In the construction shown, the lowermost end of back member 11 is bent around the sheet composing the envelope and forms an overlapping portion 47 which may be glued near its ends to the exposed face of section 14.

This end of the envelope is further strengthened by providing segmental wing portions 48 and 49 at its ends which are bent around and glued or otherwise secured to the back portion 11 at this end.

As shown in Figure 3, the flap 44 and section 19 and the associated layers of the envelope are cut out as shown at 50 and 51 to enable the card 41 to be easily gripped and withdrawn from the envelope.

Referring to Figure 3, it will be noted that the wing portions 15 and 16 are provided with notches similar to notch 46, these notches being indicated at 52 and 53. Also, the lowermost ends of these wings are provided with projecting tongue portions 54 and 55, the purpose of which will subsequently be evident.

When it is desired to disassemble or knockdown the device so that it may be placed in a small space for mailing or other purpose, the section 21 is disconnected from the side wings 15 and 16. The sections 20 and 21 may then be moved to a position where these sections lie in substantially the same plane and are disposed along the exposed surface of section 14. The wings 15 and 16 may then be moved so as to lappingly overlie sections 20 and 21. The wings are held in this position by inserting the tongue portions thereof 54 and 55 under the section 47 which may readily be accomplished since this section is glued only at its end portions. The flap 44 is then folded over the wing sections 15 and 16, as shown in Figure 2, and the tongue 45 inserted into the slots 52 and 53 which are in registration. With this arrangement, the device is held in disassembled or knocked-down condition and may be sent through the mails or disposed of as desired.

It will be noted that when the flap 44 is in the position just described, this flap also serves to close the open end of the envelope and retain the card 41 therein.

As a modification of the lens structure and lens mounting in section 21 previously described, a modified arrangement is proposed, wherein the lenses and supporting strip may be integrally formed, as shown in Figures 8 and 9.

In the modified arrangement, the strip 33' is constructed of a moldable plastic material, for example, Celluloid. Instead of, however, providing independent glass lenses, in this instance the supporting strip is provided with thickened portions 29' and 30' which are so formed as to provide integrally formed lenses. In this arrangement, the lens construction and mounting is materially simplified and the lenses may be produced at a very much lower cost than if glass lenses are provided. In the modified structure, the moldable plastic material would be placed in a suitable die and molded so as to integrally form the lens portion as well as the lens mounting strip, which is similarly notched at its ends as in the lens supporting strip previously described.

Although the present invention has been described in connection with a mailing piece, it will be apparent to one skilled in the art that the invention may with equal facility be utilized in other arrangements. Also, it will be readily apparent that instead of utilizing pictures to be viewed through the lenses, other indicia may be used.

From the foregoing description, it will be apparent that the present invention provides novel means for entertainment, instruction and education; novel mailable message bearing means and mailable souvenirs; a simplified and economical means for reproducing, transmitting and preserving natural vision; a novel optical device which may be utilized for disseminating information such as advertising matter; a novel device wherein a stereoscope is combined with a mailing piece in a manner to permit the device to be knocked-down so as to occupy a relatively small space when it is not in use, and yet be readily and easily assembled to operative condition, when it is desired to use the same; and which may be manufactured at a low cost.

It is, of course, to be understood that although I have described in detail a preferred and modified form of the invention, the invention will not be thus limited, but only insofar as defined by the scope and spirit of the appended claims.

I claim as my invention:

1. In a device of the character described, a mailing piece, a hinged wing on the mailing piece, a pair of lenses carried by said wing adapted to be disposed in spaced relation to the mailing piece and contiguous thereto, laterally disposed wings on said mailing piece arranged to be folder over said first wing to retain the lenses contiguous to the mailing piece and turnable to substantially right angled relation to the mailing piece to engage said hinged wing to support said lenses in spaced relation to the mailing piece, means for interconnecting said laterally disposed wings in said latter position, and indicia carried by the mailing piece adapted to be viewed by the lenses in the latter position.

2. In a device of the character described, an envelope having an open end, a pair of transversely spaced windows in one side of said envelope adjacent said open end, a pair of lenses, a support for said lenses hinged on said one side for selective movements to an extended position for viewing said windows and a collapsed position contiguous said one side, and a strip of indicia bearing material in said envelope longitudinally slidable therefrom to successively present the indicia thereon in said windows for viewing the same through said lenses.

3. In a device of the character described, an envelope having an open end, a pair of transversely spaced windows in one side of said envelope adjacent said open end, a pair of lenses, a support for said lenses hinged on said one side for selective movements to an extended position for viewing said windows and a collapsed position contiguous said one side, and a strip of indicia bearing material in said envelope longitudinally slidable therefrom to successively present the indicia thereon in said windows for viewing the same through said lenses, the body of said envelope extending below the extended hinged support for forming a handle by which the device may be supported for use.

4. In a device of the character described, an envelope having an open end, a pair of transversely spaced windows in one side of said envelope adjacent said open end, a pair of lenses, a support for said lenses hinged on said one side for selective movements to an extended position for viewing said windows and a collapsed position contiguous said one side, a strip of indicia bearing material in said envelope longitudinally slidable therefrom to successively present the indicia thereon in said windows for viewing the same through said lenses, and lateral flaps hinged on said envelope and foldable over said lenses and their support for maintaining them in collapsed position against said one side.

ELLIS M. BRANSON.